US006925364B1

(12) United States Patent
Huberman et al.

(10) Patent No.: US 6,925,364 B1
(45) Date of Patent: Aug. 2, 2005

(54) POWER MARKET APPROACH FOR DEVICE COOLING

(75) Inventors: Bernardo Huberman, Palo Alto, CA (US); Scott Clearwater, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 10/365,778

(22) Filed: Feb. 13, 2003

(51) Int. Cl.[7] .......................... G05D 23/00; G06F 17/60
(52) U.S. Cl. ......................... 700/300; 700/121; 705/37
(58) Field of Search .............................. 700/286, 291, 700/295–297, 299, 300, 117–121; 705/7–10, 37; 257/712–722; 361/274.1–274, 676–678, 688–723

(56) References Cited

U.S. PATENT DOCUMENTS

| 5,394,324 | A | * | 2/1995 | Clearwater ..................... 705/8 |
| 5,974,403 | A | * | 10/1999 | Takriti et al. ............... 705/412 |
| 6,115,698 | A | * | 9/2000 | Tuck et al. .................... 705/37 |
| 6,119,052 | A | * | 9/2000 | Guenther et al. ........... 700/228 |
| 6,205,799 | B1 | | 3/2001 | Patel et al. .................... 62/132 |
| 6,216,956 | B1 | * | 4/2001 | Ehlers et al. ................. 236/47 |
| 6,484,521 | B2 | | 11/2002 | Patel et al. .................... 62/171 |
| 6,512,966 | B2 | * | 1/2003 | Lof et al. .................... 700/291 |
| 6,519,509 | B1 | * | 2/2003 | Nierlich et al. ............. 700/286 |
| 6,618,709 | B1 | * | 9/2003 | Sneeringer ................... 705/412 |
| 2002/0165816 | A1 | * | 11/2002 | Barz ............................ 705/37 |
| 2003/0074166 | A1 | * | 4/2003 | Jackson et al. ................. 703/2 |
| 2003/0182250 | A1 | * | 9/2003 | Shihidehpour et al. ....... 706/21 |
| 2003/0216971 | A1 | * | 11/2003 | Sick et al. .................... 705/26 |
| 2004/0095237 | A1 | * | 5/2004 | Chen et al. ................. 340/506 |

* cited by examiner

Primary Examiner—Maria N. Von Buhr

(57) ABSTRACT

A market-based approach provides temperature control for a number of areas of a heat-generating device. Bids for a cooling resource are generated, each bid associated with a particular area of the device. A market price is determined at which the cooling resource is available to the device areas. Amounts of the cooling resource are allocated to the device areas based on the market price and the bids. Allocated amounts of the cooling resource are directed to the device areas.

30 Claims, 11 Drawing Sheets

POWER MARKET APPROACH FOR DEVICE COOLING

FIELD OF THE INVENTION

The present disclosure generally relates to temperature control of devices, and, more particularly, to cooling devices using a market-based control approach.

BACKGROUND

As electronic components become larger, faster, and more powerful, they also generate more heat. Effective cooling of heat-generating, devices, such as microprocessors used in pocket computers, laptops, and other devices, is becoming an increasingly important consideration. With processor speeds exceeding several GHz, and with multiple CPUs and memory units fabricated on a single chip producing high component densities, cooling semiconductor devices is critical to product reliability.

The relatively low power operation of many older processors allowed the use of traditional air-cooled heat sinks for heat control. These traditional methods use heat sinks coupled to a single device or to a number of devices within a chassis to conduct heat away from the device or devices. The heat sinks may optionally be cooled by fans. Air cooled heat sinks typically provide only limited capacity for heat removal and provide little capacity for moderating thermal gradients within a chassis or over the surface of a single device.

Higher power components require substantially greater heat dissipation than air-cooled heat sinks can provide and require more effective cooling methods. One such method denoted spray cooling, involves the application of a liquid coolant onto the surface of the component. Current sprayer designs commonly employ either pressurized liquid spraying (i.e., pressure-assisted spraying) or pressurized gas atomizing.

Spray cooling configurations typically spray a uniform or uncontrollably varied distribution of coolant across each chip. Spray cooling systems are difficult to control and are limited in their ability to limit "pooling" of the fluid (i.e., building up of liquid on the cooled device due to excessive spray rates). In addition, high power semiconductor components, such as microprocessors, may incorporate some areas, e.g., the CPU, that generate significantly more heat than other areas of the component. Thus, thermal gradients across a heat generating component may result in insufficient cooling resources directed to some areas of the component by spray cooling systems.

SUMMARY OF THE INVENTION

The present disclosure details a method and apparatus for temperature control of a heat-generating device. In accordance with one embodiment, a method for cooling a device involves generating respective bids for a cooling resource. Each bid is associated with a particular area of a plurality of device areas. A market price at which the cooling resource is available to the plurality of device areas is determined. Allocated amounts of the cooling resource are directed to the plurality of device areas as a function of the market price and the bids.

Another embodiment of the invention involves a method for temperature control of a device. Bids for a thermal resource are generated, wherein each bid is associated with an amount of the thermal resource desired at one of a plurality of device areas. A market price for the thermal resource is determined. Amounts of the thermal resource are allocated among the plurality of device areas based on the market price and the bids. The allocated amounts of the thermal resource are delivered to the plurality of device areas.

A further embodiment of the invention involves an apparatus for cooling a device. The apparatus includes a sensing system for detecting a need for cooling resources at a plurality of device areas. The apparatus further includes a delivery system for delivering a cooling resource to the device areas. The delivery system and the sensing system are coupled to a control system. The control system is configured to generate bids for cooling resources, determine the market price for the cooling resources and allocate amounts of the cooling resources to the device areas as a function of the market price and the bids.

According to another embodiment of the invention, a device cooling system includes means for generating respective bids for a cooling resource. Each bid is associated with one of a plurality of areas of a device. The system further includes means for determining a market price at which the cooling resource is available to the plurality of device areas. The system further includes means for directing allocated amounts of the cooling resource to the device areas as a function of the market price and the bids.

According to yet another embodiment of the invention, a temperature control system includes means for generating bids for a thermal resource, each bid associated with an amount of the thermal resource desired at one of a plurality of device areas, means for determining a market price at which the thermal resource is available, means for allocating the thermal resource to the plurality of device areas based on the market price and bids, and means for delivering allocated amounts of the thermal resource to the plurality of device areas.

According to a further embodiment of the invention, a computer-readable medium is configured with instructions for causing one or more computers to perform a method for cooling a device. The method includes generating respective bids for a cooling resource associated with a plurality of device areas, determining a market price at which the cooling resource is available to the plurality of device areas, and directing allocated amounts of the cooling resource to the plurality of device areas as a function of the market price and the bids.

According to yet another embodiment of the invention, a computer-readable medium is configured with instructions for causing one or more computers to perform a temperature control method involving generating bids for a thermal resource, each bid associated with an amount of the thermal resource desired at one of a plurality of device areas, determining a market price at which the thermal resource is available, allocating the thermal resource to the plurality of device areas based on the market price and bids, and delivering allocated amounts of the thermal resource to the plurality of device areas.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
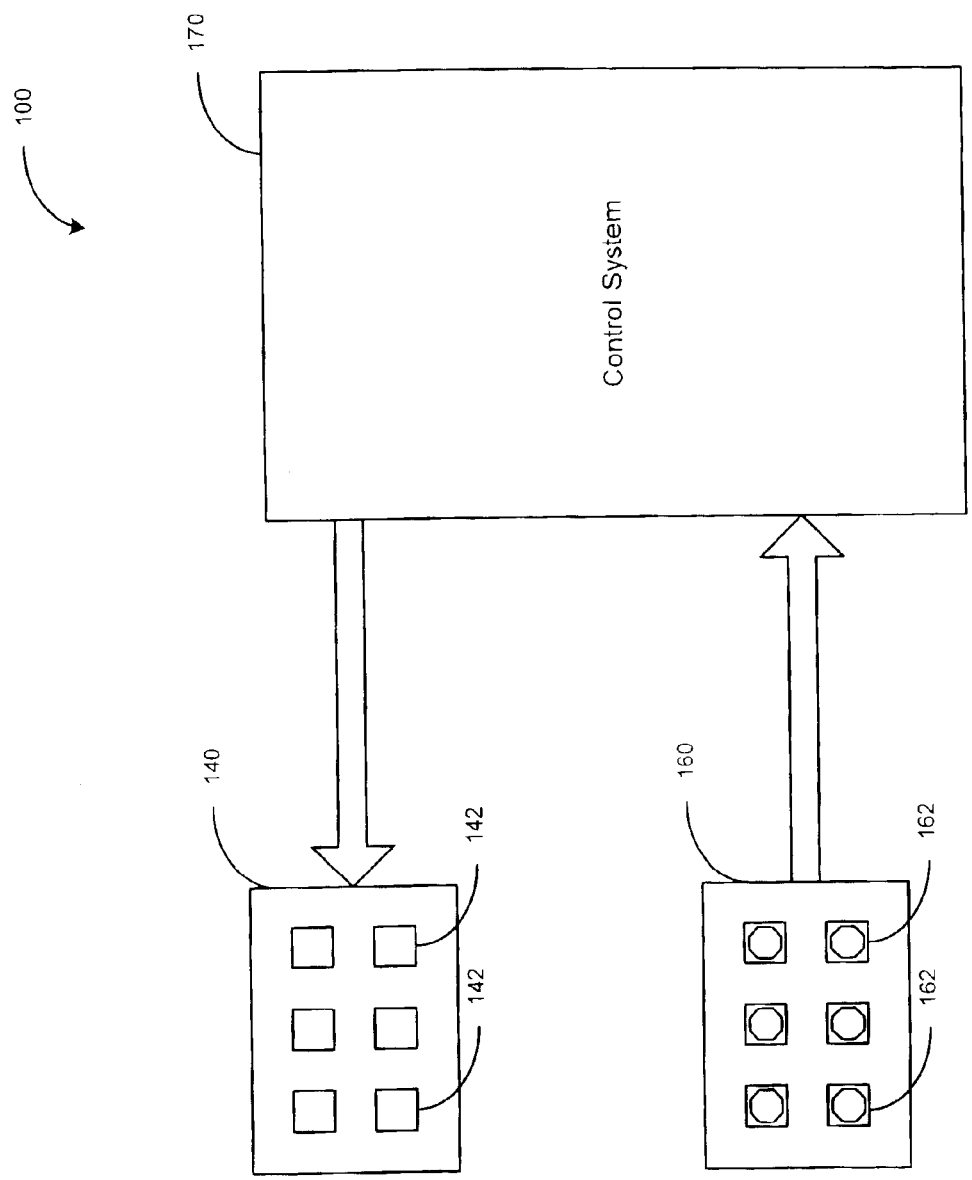
FIG. 1 is a block diagram of a cooling system for implementing the market-based temperature control system according to various embodiments of the present invention

The present invention provides a market-based control system approach for cooling electronic devices. The various configurations described herein may be applied, for example, to cooling electronic devices incorporating a number of components, or to cooling areas of one or more components of a device. The invention is particularly suitable for use with large area, high power semiconductor devices, e.g., microprocessors, providing more effective distribution of cooling resources. Furthermore, the invention provides methods and systems useful in achieving a desired energy expenditure or energy savings goal associated with device cooling.

The implementations described herein involve the use of a market-based control system for temperature control of heat-generating devices. According to various embodiments, a number of areas of the device act as "consumers" of cooling resources. Each area of the device is associated with an independent market-agent. Each market-agent bids for a quantity of a cooling resource available to the device. The requested quantity of the cooling resource may be expressed in terms of a particular temperature and/or volume of a gaseous or liquid coolant, for example.

A bid may be determined as a function of the difference between a target amount of cooling resource and the actual amount of cooling resource delivered to a particular device area. If the measured amount of cooling resource delivered to the area is less than the target amount at a particular area, the market agent associated with the area may venerate a bid to buy an amount of a cooling resource. If the measured amount exceeds the target amount, the market agent associated with the location may generate a bid to sell an amount of a cooling resource.

In one embodiment, the amount cooling resource at a particular area is determined by sensing the temperature of the area. In this example, a target temperature in a particular area is compared to a measured temperature to assess the amount of cooling resource being delivered to the area.

In another embodiment, the amount of cooling resource delivered to a particular area is assessed by determining the cooling regime of the area. This implementation may be particularly useful, for example, when the cooling resource supplied is a liquid coolant delivered by a spray cooling system. In this example, sensors located on or near the device or component area sense the state of the cooling regime close to the surface of the chip. If coolant pooling is detected, for example, then the amount of coolant delivered to the area is too large. Conversely, a dry area devoid of any liquid coolant or coolant evaporant indicates that the amount of coolant delivered to the area is too small. In this "dry-out" regime, heat is dissipated from the chip surface by thermal radiation only.

In addition to using a target temperature and/or the cooling regime of the area to determine the bids, other factors may also be taken into consideration in determining the bids, such as the ambient temperature and/or temperature gradients in the vicinity of the area, the rate of change of temperature at the area, the thermal operating characteristics, i.e., thermal resistance, associated with the area, and/or the activity level of the components or sub-components in the location, e.g., the electronic activity level of the device or component area as measured by the number of operations or data transfers per unit time.

The cooling resources delivered to the device or component area may range from one to any number. For example, a first cooling resource delivered to an area may be an air flow; a second cooling resource may be air delivered at a particular temperature; a third may be flow of coolant in a heat pipe; and a fourth, mass flow rate of a liquid coolant. Delivery of other cooling resources may be controlled using the market-based approaches described herein and are considered to be within the scope of the invention.

Prices for the cooling resources may be determined using a market-based approach. The bids generated by the market agents associated with areas of a device or component are analyzed to determine supply and demand functions for the cooling resources. The market price for a cooling resource may be established as the equilibrium point at which the supply function and the demand function are substantially equal for the cooling resource. One or more cooling resources are allocated among the device locations based on the determined prices of cooling resources and the bids submitted by the market agents associated with the device areas. Allocated amounts of the cooling resources are then distributed to the areas in accordance with the location bids.

A cooling system configured according to various embodiments of the invention is adaptable to individually cool different regions of a heat-producing component or device, where each region has differing heat dissipation requirements. The cooling system may be configured, for example, as a component-level assembly containing detection systems to separately monitor the cooling regime occurring in each region of a component, a delivery system to direct an allocated amount of coolant to various regions of the component, and a control system for implementing the market-based temperature control system. The cooling system may optionally be configured as an integral part of a component, for example. With this technology, a computer system can use complex components having extreme and varying heat dissipation requirements, while allowing the components to be installed, replaced and/or upgraded with reduced effort.

FIG. 1 illustrates a block diagram of a cooling system 100 for implementing the market-based temperature control system according to various embodiments of the present invention. The cooling system 100 includes a delivery system 160 for delivering cooling resources to a device. The delivery system 160 may include, for example, one or more groups of coolant delivery actuators 162 for delivering incremental amounts of coolant to the surface of an electronic component. The coolant delivery actuators are coupled to a control system 170 and are controlled by signals generated by a control system 170.

The device cooling system 100 further includes a sensor system 140 having an array of sensors 142 for measuring temperatures at a number of locations of an electronic device or component. The sensor outputs are coupled to the control system 170. According to one embodiment, the controller compares the temperatures measured at the device locations to target temperatures and uses the comparisons to generate the bids for cooling resources.

Figure 2:
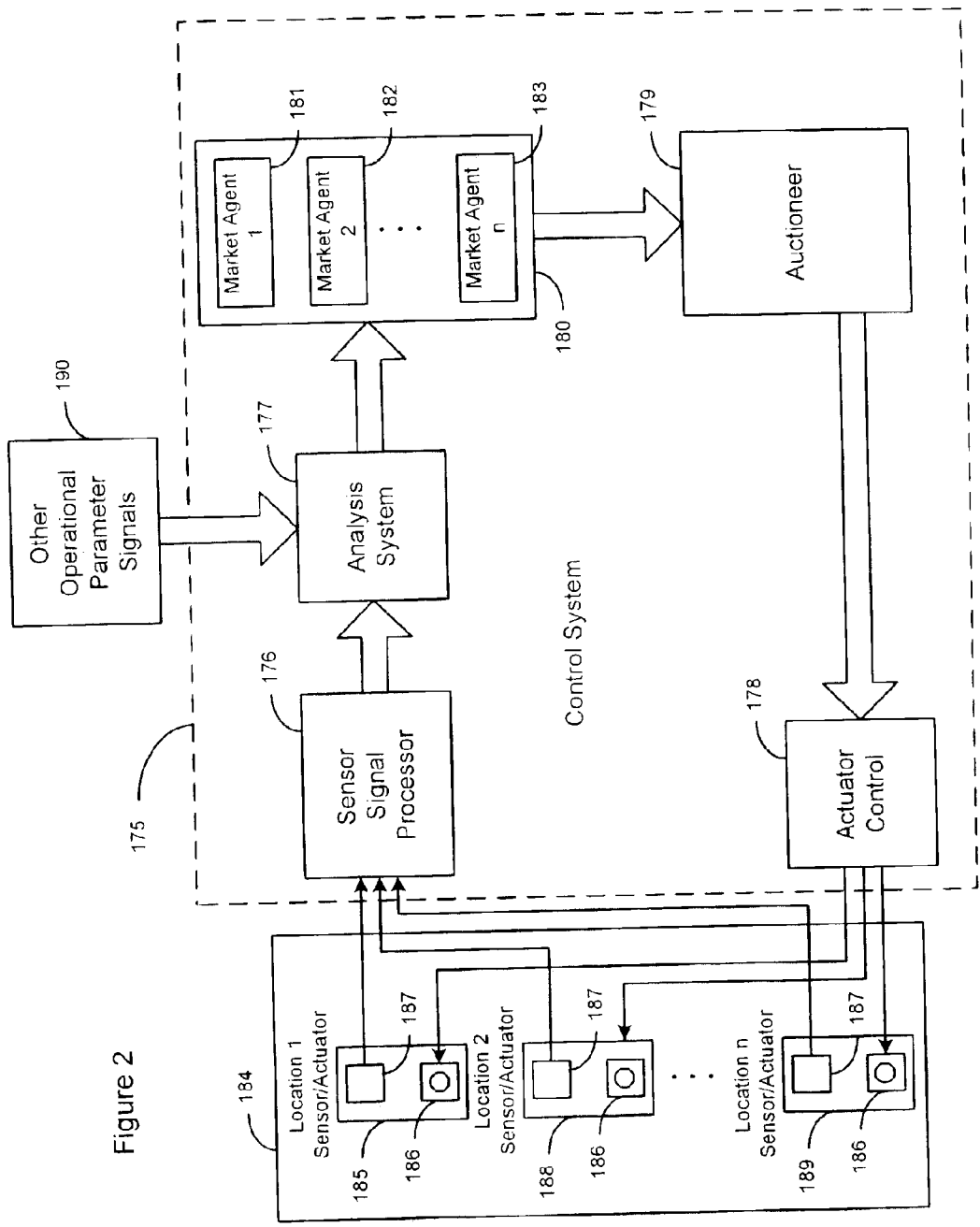
FIG. 2 is a block diagram of a control system arranged in accordance with various embodiments of the invention.

FIG. 2 provides a more detailed block diagram of a cooling control system 175 in accordance with one embodiment of the invention. Sensors 187 are positioned on or near a number areas 185, 188, 189 of a component 184 and are arranged to detect the amount of a cooling resource delivered to the respective areas 185, 188, 189. Coolant delivery actuators associated with the areas 185, 188, 189 of the component 184 are positioned to deliver the coolant resource to the areas 185, 188, 189. The sensors 187 are coupled to a sensor signal processor 176 that receives and processes the signals from the sensors 187. The sensor signal processor 176 may include, for example, various drivers, amplifiers, and/or filters for energizing the sensors 187 and conditioning the signals received from the sensors 187. The sensor signal processor 176 may also include an A/D converter for digitizing the sensor signals.

The sensor signal processor 176 may optionally be coupled to a thermal analysis system 177. The thermal analysis system 177 receives the output signals of the sensor signal processor 176, as well as signals associated with various additional parameters 190 relevant to the assessment of cooling resources needed at the l through n locations 185, 188, 189 of the component 184.

A representative set of parameters useful in assessing the cooling resource needs of a particular area of a device or component may include, for example, the status of the cooling regime of the area, the temperature of the area, the temperature rate of change of the area and/or neighboring areas, the actual or expected activity of the components or sub-components positioned within the area, number of memory accesses, computations, data transfers, etc., per unit time, power-down status, sleep mode status and/or chip select status of the area, operating frequency of the area, and the thermal resistance of the area. Additional parameters may also be useful in determining the cooling resource needs of the area, and may be used in the cooling needs assessment in a manner analogous to the implementations described in more detail below.

The thermal analysis system 176 uses signals from the sensor signal processor 176 and signals associated with one or more additional parameters 190 provided above to project the cooling resource needs of the area over a selected time interval. An implementation using one or more of the additional parameters listed above may provide enhanced control of cooling resources.

In one example, the thermal analysis system compares the actual temperature of the area and the target temperature of the area to determine the cooling resource needs of the area. In a second example, the thermal analysis system determines the difference between the actual temperature of the area and the target temperature of the area, and additionally considers the rate of change of the actual temperature in the area during a recent time interval.

In the second example, the cooling resource needs of the area are assessed using both the temperature comparison and the temperature rate of change, thus providing enhanced control.

The thermal analysis system may predict or project the cooling needs of a device or component area by assessing the current or future heat generating activity of the area. Activity in this context is associated with any process that dissipates power in the device or component area, generating heat in the area. If the activity of the device or component area is low, then less heat will be generated, and the need for cooling resources is correspondingly reduced. Activity may be determined in a number of ways, including, for example, examining the status of chip select, sleep state and/or power down lines associated with the device of component area. Furthermore, current or future chip activity may be discerned from the number of memory access, data transfers, or other operations per unit of time currently being performed per unit time, or scheduled to be performed.

The thermal dissipation characteristics of a device or component area, most frequently euphemistically expressed as "thermal resistance" in units of EC/W, may also be used to project the cooling resource needs. Thermal resistance is typically expressed as the sum of the two parameters $\theta_{JC}$ and $\theta_{TA}$. The device junction to package thermal characterization parameter denoted by $\theta_{JC}$, is defined as the temperature difference between junction and top center of the package divided by the power. The top-to-ambient thermal characterization parameter is denoted $\theta_{TA}$. Accordingly, these parameters may be used to assess the ability of a device to dissipate generated heat, and thus may be used to more accurately assess cooling resource needs of a device or component area.

The sensed parameters of the respective areas 185, 188, 189, and, optionally, thermal analysis data determined by the thermal analysis system 177, is provided to the market agents 181, 182, 183 associated with the respective l through n areas 185, 188, 189. The market agents use the sensor and thermal analysis information to generate bids for cooling resources as described in more detail in connection with the discussion of the flowcharts of FIGS. 9 and 10 below.

Each market agent 181, 182, 183, determines if an increased or a decreased amount of a cooling resource should be directed to the area 185, 188, 189 associated with the market agent 181, 182, 183 to achieve the target cooling for the area 185, 188, 189. If a market agent determines that an increased amount of the cooling resource is needed, the market agent generates a buy bid, including a quantity of the cooling resource the market agent proposes to buy and the price. In this implementation, the device or component areas may be considered the "consumers" of the cooling resource, and the cooling system may be considered the "producer" of the cooling resource.

In another implementation, the market agents may generate either buy bids or sell bids. For example, if a market agent 181, 182, 183 determines that a decreased amount of the cooling resource is needed, the market agent 181, 182, 183 generates a sell bid, including a quantity of the cooling resource the market agent proposes to sell and the price. If a market agent 181, 182, 183 determines that an increased amount of the cooling resource is needed, the market agent 181, 182, 183 generates a buy bid, including a quantity of the cooling resource the market agent proposes to buy and the price.

The bids generated by the market agents 181, 182, 183 are transmitted to a market auctioneer 179. The market auctioneer may include two or more auctioneers if two or more cooling resources are being bid for by the market agents. In submitting the bids, each market agent can submit either a single bid, or a collection of bids (e.g., quantity1 at price1, quantity2 at price2, quantity3 at price3, etc.). When collections of bids are submitted to the auctioneer, they used to generate demand functions associated with each market agent.

An aggregate demand function is determined for the bids submitted by the market agents. An aggregate supply function may be determined from the quantities of the cooling resource made available by the cooling system, or from the sell bids submitted by the market agents. A market equilibrium price and quantity are computed. The demand functions of the market agents are assessed with respect to the supply function to adjust the amount of cooling resources directed to the areas associated with the market agents. By assessing the demand functions of individual market agents, priority of system resources can be more efficiently allocated to device or component areas.

Control signals transmitted from the auctioneer 179 to the actuator control 178 indicate the allocated amounts of cooling resource to be directed to the device or component areas. The actuator control 178 activates the individual actuators 186 to deliver allocated amounts of the cooling resource to the areas 185, 188, 189.

Figure 3:
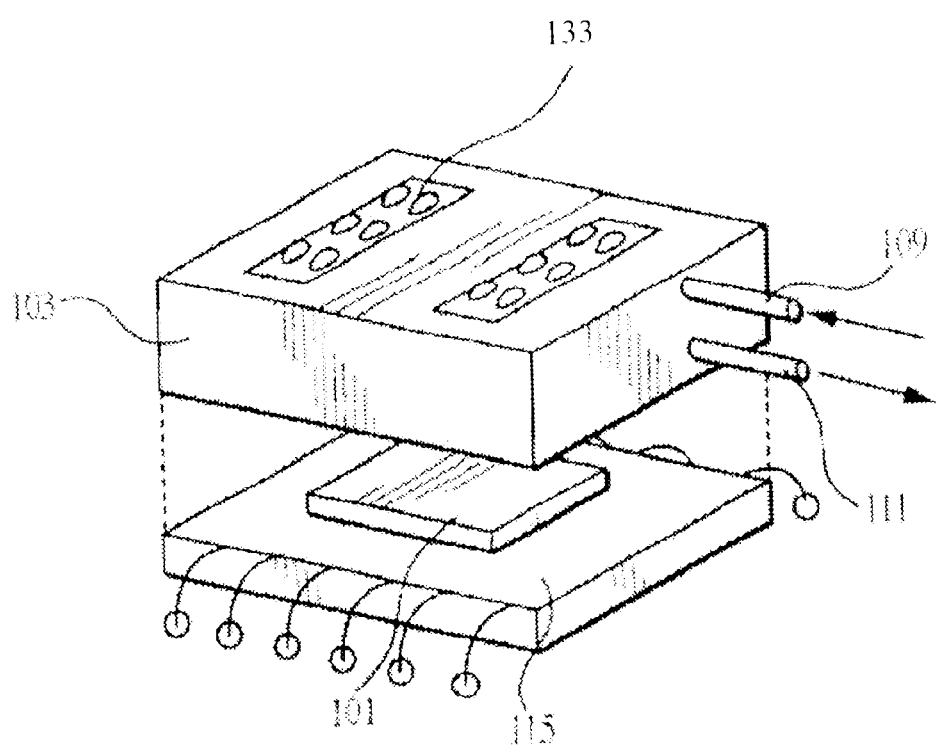
FIGS. 3 and 4 are diagrams illustrating a coolant delivery system arranged in accordance with embodiments of the invention.
Figure 4:
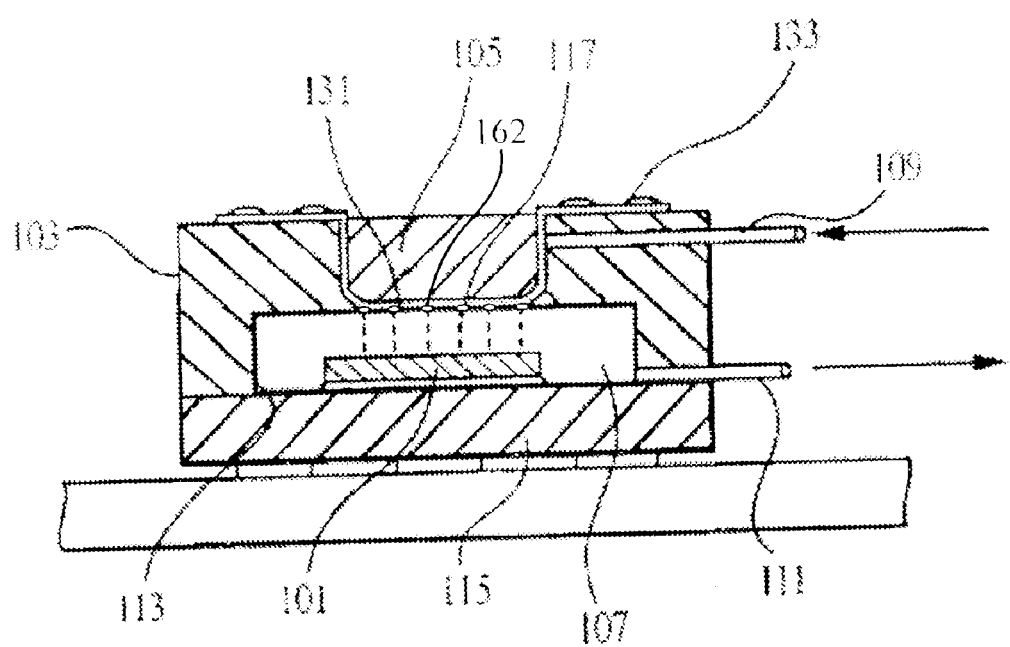

With reference to FIGS. 3 and 4, an embodiment of a coolant delivery system for cooling a component including a semiconductor chip 101, and a component substrate 115 is illustrated. The coolant delivery system includes a housing forming a cooling cap 103, and at least one spray head 105. The cooling cap 103 and spray head 105 may be integrated into a single cooling assembly, forming, with the component, a cooled semiconductor assembly. The cap 103 is arranged to form a spray chamber 107 in which cooling fluid can be sprayed into thermal contact with, and preferably directly onto, the chip 101. The cap 103 includes an inlet 109 for receiving cooling fluid, preferably in a liquid state. An outlet 111 for liquid and/or gaseous cooling fluid preferably extends from the spray chamber 107 formed by the cap 103. The inlet 109 and outlet 111 can lead to external cooling system components, such as a condenser and reservoir, or to other components that are integral with the cooling cap.

The cap 103 includes portions 113 configured to adjoin the component on one or more surfaces of a component substrate 115, forming a spray chamber 107. The component substrate 115 and chip 101 form the component, which can optionally include an encapsulant or lid. However, the component may be configured in the conventional form of an integrated circuit component that has not received an encapsulant or lid, as the cooling cap 103 serves the function of covering and protecting the chip 101.

The spray head 105 is configured to spray cooling fluid 117 from one or more incremental coolant sprayers 162 onto the chip 101. Upon contact with the chip 101, some, or more preferably all, of the cooling fluid is vaporized. The cooling fluid vapor that forms during the cooling process is retained in the spray chamber 107 around the chip until it passes out the outlet 111.

In one embodiment, the spray head 105 is equipped with a large number of incremental sprayers, 162 each configured and targeted to eject an incremental amount of the cooling fluid on a particular location of the chip 101. The cooling fluid 117 is delivered in response to a control signal, which is sent to the incremental sprayers 162 of the sprayer head 105 by a controller. The quantity of cooling fluid 117 sprayed from incremental sprayers 162 can be highly controllable, such as by separately controlling the rate at which incremental amounts of cooling fluid 117 are ejected from each incremental sprayer 162.

By increasing or decreasing the frequency that a particular group of incremental sprayers 162 is energized, their flow rate can be accurately adjusted. Furthermore, because the sprayers 162 targeting one region of a chip 101 can be accurately controlled to deliver different flow rates than the sprayers over other regions of the chip 101, the heat dissipation on different regions of the chip 101 can be accurately and distinctly controlled by energizing one group of the sprayers at a rate greater than that of another group of the sprayers.

Figure 5:
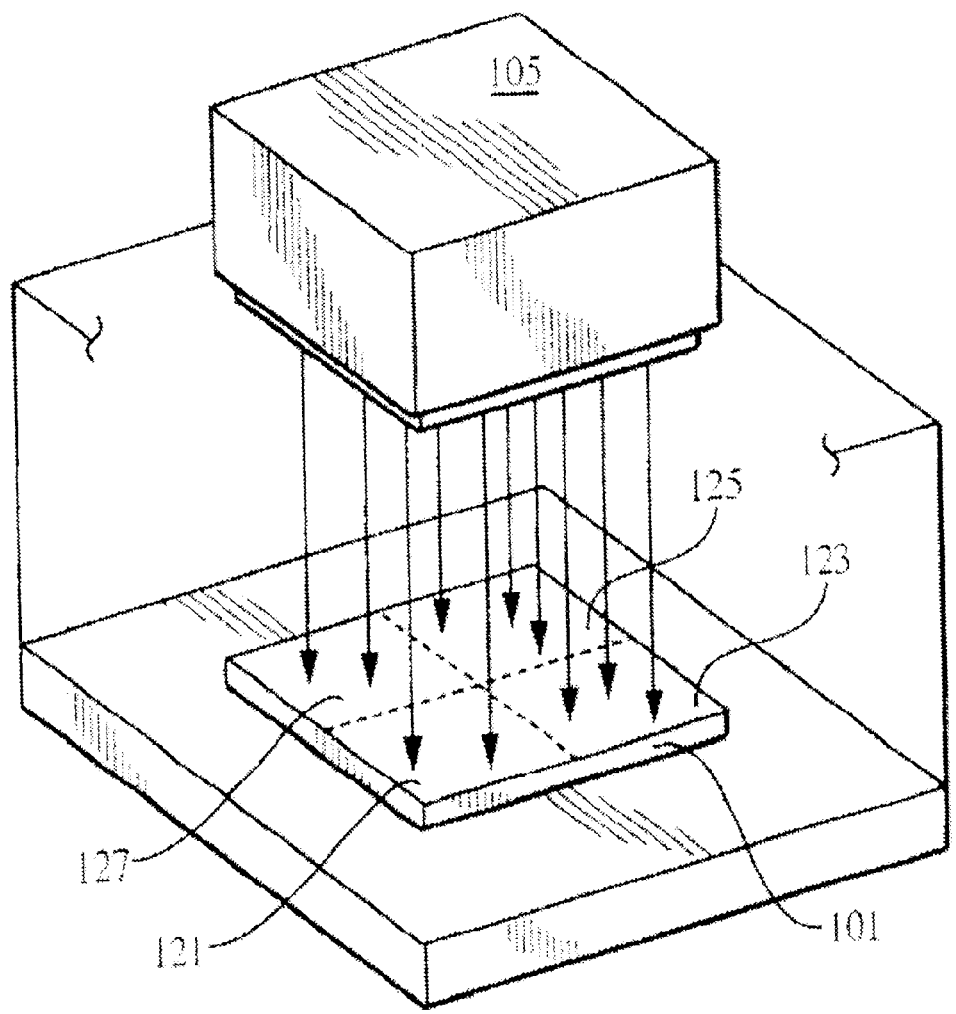
FIG. 5 is a diagram illustrating the delivery of a coolant to the surface of a heat-generating device in accordance with embodiments of the invention.

With reference to FIG. 5, the chip 101 may have various regions 121, 123, 125, 127 that operate at different power levels and require different heat dissipation rates. For example, a first CPU region 121 will operate at a greater power level than a first cache region 123 or a second cache region 125. A second CPU region 127 may also operate at a greater power level that does not necessarily coincide with the greater power level of the first CPU region 121. The sprayer head 105 has four groups of one or more, preferably incremental sprayers, each group being associated with and targeted at one of the four regions 121, 123, 125, 127 of the chip 101. The incremental sprayers may be controllable individually, or in groups, thus allowing control over the dissipation level of each region 121, 123, 125, 127 of the chip 101. Individual control of the incremental sprayers provides a system that could provide mass flow rates that vary by some predetermined pattern over the device or component area, such as a mass flow rate that is maximum at a center of a hot region, and decreases with distance from that hot spot.

As described with reference to the block diagrams of FIGS. 1 and 2, the cooling system further includes a control system including a controller configured to control the fluid mass flow rate through the sprayers. In one example, the controller controls the mass flow rate through each group of sprayers. The control system provides the cooling system with the ability to cool different regions of the chip at different rates, each rate being appropriate to its related region's preferable temperature. As previously described, the controller may be arranged to control the coolant delivery rate through each sprayer, using various parameters to determine the coolant resource allocation to each area 121, 123, 125, 127 of the chip 101. The controller may be electrically connected to the spray head 103 via a plurality of contacts 133 mounted on the cap 103. The contacts are preferably integrated in the cap and exposed on its exterior. This can be done with a flex circuit connection, or for a ceramic cap, the electrical connections can be routed in ceramic. Optionally, the controller could be based in the chip 101 and signals routed through the component substrate 115 and cap via a connector (not shown).

With reference to FIG. 4, a suitable type of incremental sprayer for the spray head 105 is an inkjet-type sprayer. The spray head includes a nozzle plate 131 that forms a plurality of incremental sprayers 162 configured as thermal inkjet sprayers ("TIJ sprayers"). The nozzle plate is 131 located on the cap 103 so as to direct spray toward the chip 101 through the spray chamber 107. The nozzle plate 131 can be incorporated in a TIJ sprayer head, as is known in inkjet spray technology.

Figure 6:
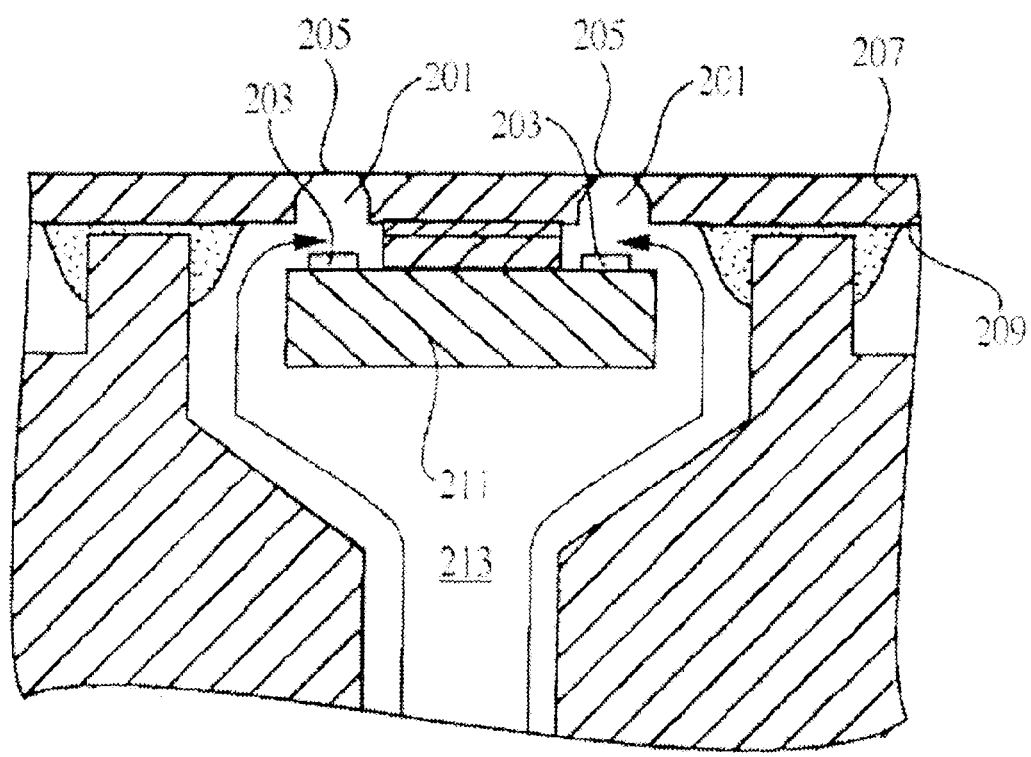
FIG. 6 is a diagram illustrating a thermal inkjet type incremental coolant sprayer configured in accordance with embodiments of the invention.

As illustrated in FIG. 6, each TIJ sprayer includes structure defining an ejection chamber 201 for receiving a predetermined portion of cooling fluid, and a heater 203 for vaporizing a sub-portion of the predetermined portion of cooling fluid to create the pressure to eject an incremental amount of cooling fluid through an orifice 205 that directs the ejected cooling fluid toward the chip 101 (FIG. 3). The orifices are preferably formed in a flexible polymer tape.

Affixed to a back surface 209 of the tape 207 is a silicon substrate 211 containing the heaters 203, in the form of individually energizable thin-film resistors. Each heater may be located on a side of the ejection chamber 201 across from the ejection chamber's orifice 205, or other suitable locations. Cooling fluid may be drawn and loaded into the ejection chamber by capillary action from a passage 213, as is typical for an ink-jet type device. A controller energizes the heater, vaporizing the portion of the cooling fluid adjacent to the heater. The vaporized cooling fluid expands, expelling most of the non-vaporized cooling fluid out of the orifice, typically in the form of a single droplet.

The controller may be electrically connected to the heater via a plurality of contacts 133 as shown in FIGS. 3 and 4. The contacts 133 are preferably integrated in the cap 103 and exposed on its exterior. This can be done with a flex circuit connection, or for a ceramic cap, the electrical connections can be routed in ceramic. Optionally, the controller could be based in the chip 101 and coupled through the component substrate 115 and cap 103 via a connector (not shown).

A suitable technology for implementing spray cooling in accordance with principles of the invention is discussed in U.S. Pat. No. 6,484,521, which is incorporated herein by reference in its entirety. The incremental sprayers can alternatively be based on other types of droplet expelling technology, such as piezoelectric technology (i.e., piezoelectric nozzles). Examples of this technology are discussed in numerous U.S. Patents, including U.S. Pat. Nos. 5,924,198, 4,500,895, and 4,683,481, which are incorporated herein by reference for all purposes. Other thermal ink-jet technologies, or other individually controllable sprayers can likewise be used.

The spray cooling systems can feature the ejection of incremental amounts of a cooling fluid on the heat source, using an incremental sprayer, spaced over a number of time increments. Either the time between ejections or the incremental amount ejected can be varied to adjust the flow rate to an optimal level.

Figure 7:
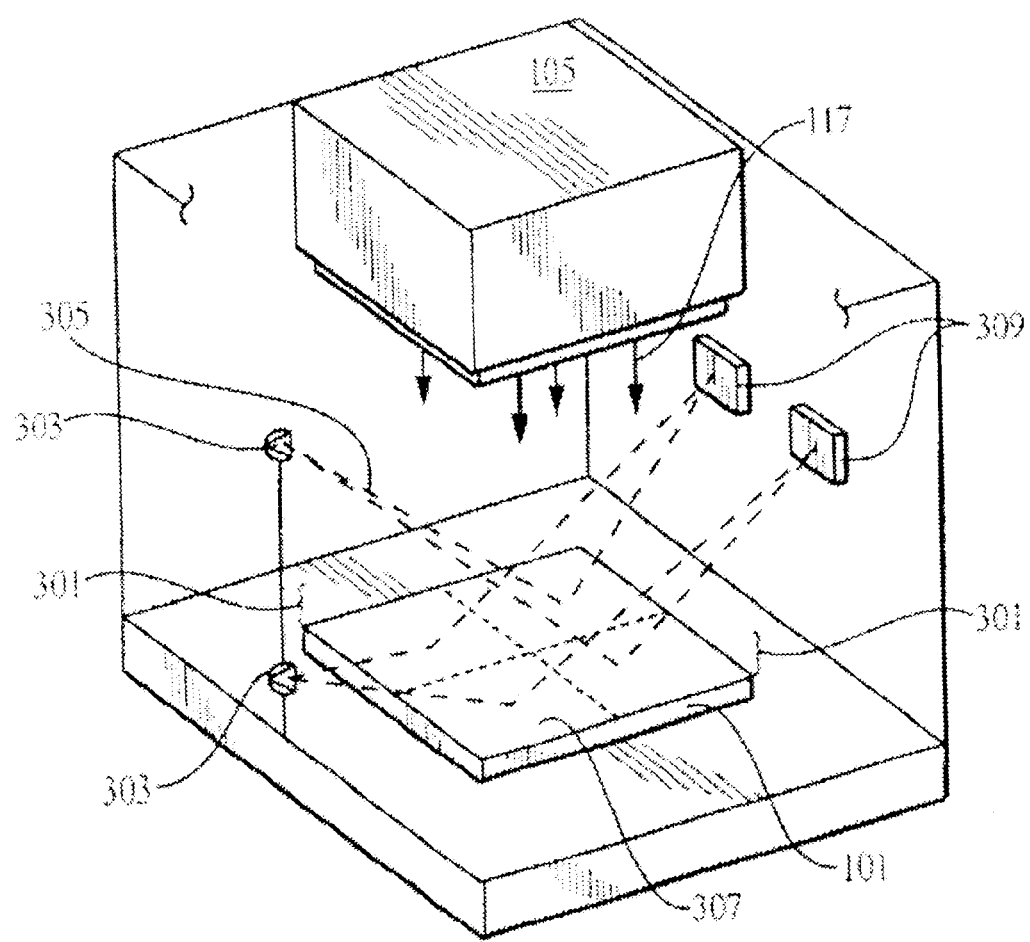
FIGS. 7 and 8 are diagrams illustrating sensing systems arranged in accordance with embodiments of the invention.
Figure 8:
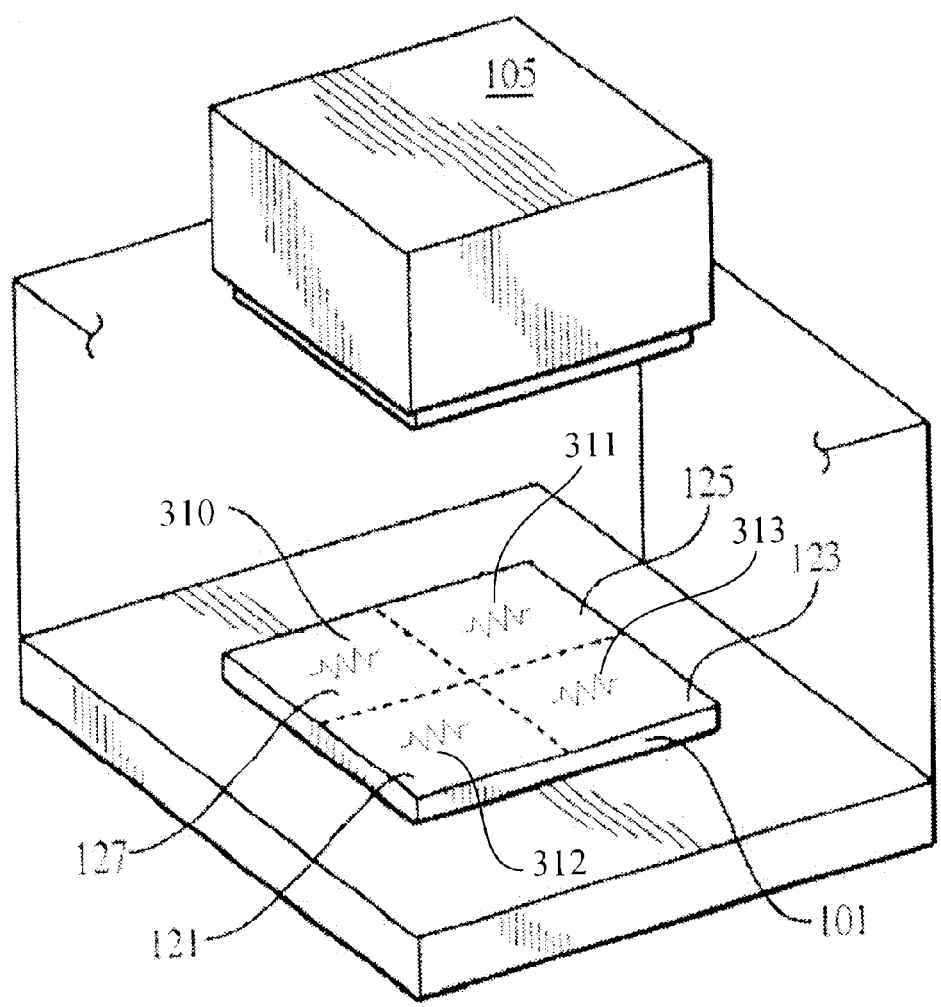

With reference to FIGS. 7 and 8, a sensor system located on or near the device or component area is used to monitor various parameters indicative of the chip's thermal state. In the example illustrated in FIG. 8, the sensors monitor the chip's temperature at various locations. The temperature information is transmitted to the control system and used to assess the cooling resource needs of the area.

In another example, illustrated in FIG. 7, the sensor system monitor parameters indicative of the cooling regime that is occurring at the chip's surface. The spray head 105 emits a spray of liquid cooling fluid 117 targeted at the chip 101. The cooling fluid enters a reaction zone 301 immediately adjacent a surface of the chip and comes into thermal contact with the surface, where the cooling fluid becomes significantly exposed to the heat being dissipated from the chip. The cooling fluid reacts to the heat's energy by connectively heating and/or evaporating.

The system controls the spray cooling rate to provide continuous evaporation of cooling fluid. At an optimal rate, vaporization occurs in the nucleate-boiling regime (i.e., the cooling fluid forms a thin film on the chip that vaporizes immediately). If the sprayer's mass flow rate is decreased below a minimum level for the nucleate boiling regime, then inadequate cooling fluid is available to dissipate the heat and the cooling regime enters a dry-out regime where the chip's temperature increases substantially until the generated heat is dissipated through radiant conduction.

If, as the sprayer's mass flow rate is increased above a maximum level for the nucleate boiling regime, cooling fluid begins to pool on the chip, it enters a pool-boiling regime, which is equivalent to immersion and has substantially lower dissipation levels than the nucleate boiling regime. Thus, the temperature rises substantially until the necessary dissipation level is reached, either in nucleate boiling or radiant heating. Therefore, it is important for spray cooling to be conducted at a proper mass flow rate, maintaining a nucleate boiling regime (or close to it). This makes critical the design of the sprayer, i.e., the design of the nozzle and its related spray devices. To sense and thereby controllably maintain a desired level of dissipation in a desired cooling regime, the detection system detects the dissipation level and/or cooling regime in the reaction zone 301, and thus the related wall temperature of the heat source.

In accordance with this example embodiment, the sensor system includes two radiation sources 303 which are configured to emit radiant energy 305 through the reaction zone 301, impinging on the cooled surface 307 of the chip 101. The radiant energy is of a type that reflects off the cooled surface, and preferably is in the optical spectrum. The reflected radiant energy preferably passes again through the reaction zone, and then continues to be sensed by one of two radiation sensors 309, which arc also part of the detection system.

Preferably, the radiation sources 303 and the radiation sensors 309 are placed close to the semiconductor device 101. The sources 303 direct the radiant energy 305 onto the chip's surface and the sensors 309 collect the reflected radiant energy, producing a signal having an intensity proportional to the reflected radiant energy's intensity. The type of radiant energy is selected such that the reflected radiant energy will be partially obstructed, and will therefore vary in intensity, as it passes through the reaction zone 301. This intensity change will vary depending on the state of the cooling fluid in the reaction zone 301, and thus it will be indicative of the cooling regime occurring at the time. In particular, the intensity will vary as the cooling regime moves from the nucleate boiling regime to the critical heat flux regime or the dry-out regime in the reaction zone 301.

The radiation sources 303 and sensors 309 are preferably positioned so that, in different combinations, they can be used to detect the cooling regime occurring in each region of the chip. The radiation sources 303 can be used sequentially so that each sensor 309 can differentiate between the sources of the radiant energy received, or each source 303 can emit radiation that can be filtered from the other.

Turning now to FIG. 8, another embodiment of the sensor system is illustrated in the diagram of FIG. 8. In accordance with this embodiment, an array of temperature sensors 310, 311, 312, 313 are arranged on or near the surface of the chip 101. In the illustrated embodiment, the temperature sensors 310, 311, 312, 313 may be implemented, for example, as an array of thermoresistors located on the chip's surface. The thermoresistors 310, 311, 312, 313 may be coupled to a sensor signal processor and controller mounted on the chip, for example. The thermoresistors 310, 311, 312, 313 are used to sense the temperature of the areas 121, 123, 125, 127 of the chip 101. The temperature information is transmitted through a sensor signal processor to the control system for cooling resource assessment.

Temperature sensing may also be implemented using other known technologies. For example, thermocouple sensing, infrared (IR) thermal imaging, or (charge coupled device) CCD imaging may also be applicable to detect temperatures of one or more areas of a device or component. In addition to temperature, various other environmental and/or operating parameters, such as those listed above as representative parameters may be sensed by the sensor system and used in combination with the temperature parameter for implementing embodiments of the market-based control system of the present invention.

Signals indicating the state of the cooling regime, area temperature, etc., are processed by a sensor signal processor and may be analyzed in conjunction with other environmental and/or operating parameters to more fully assess the cooling resource needs of a device or component area. The thermal analysis may include, for example, the extrapolation of cooling needs to a future point in time based on known parameters. The rate at which the sensor and other signals are transmitted to the control system may vary depending on a number of factors, including, for example, the computational speed of the sensor system and/or the control system, and the desired or accepted temperature variation with time.

Sensor and thermal analysis data is transmitted to market agents associated with the respective areas of the device or component. The market agents, acting in cooperation with a control system auctioneer, determine the allocation of cooling resources directed to the areas of the component or device. A flowchart illustrating an example method of providing cooling resources to a device or component is provided in FIG. 9.

Figure 9:
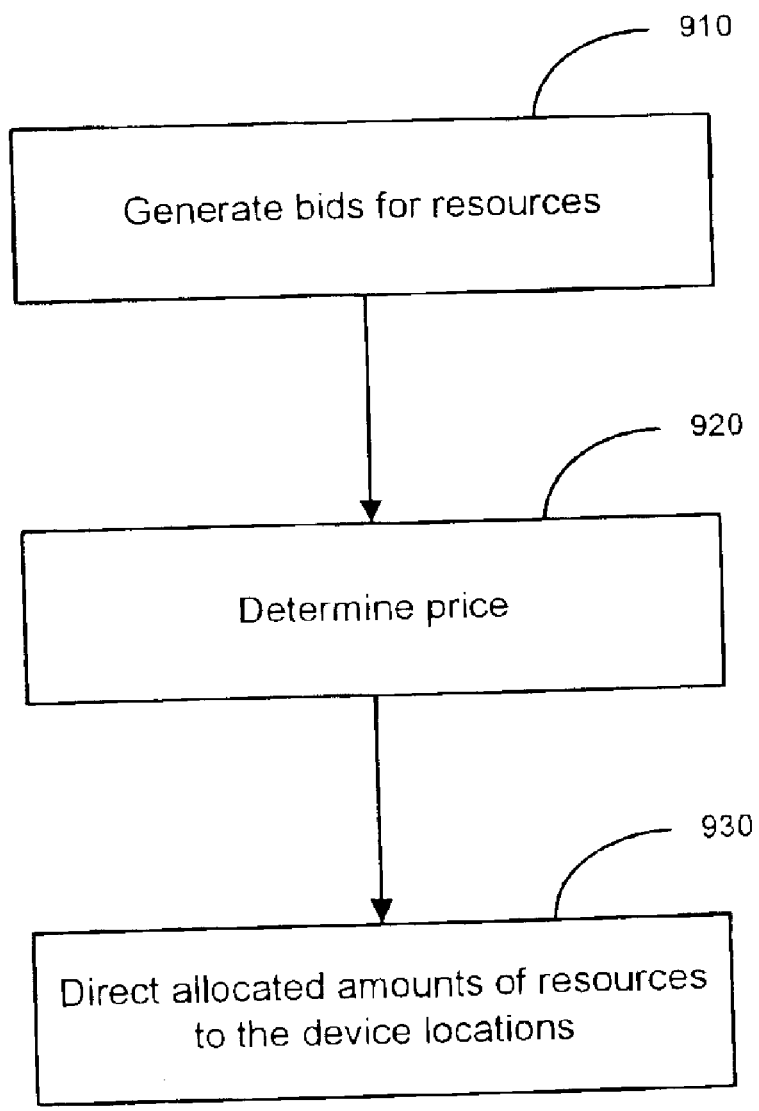
FIG. 9 is a flowchart illustrating a market-based method for delivering thermal resources to a device in accordance with embodiments of the invention.
Figure 11:
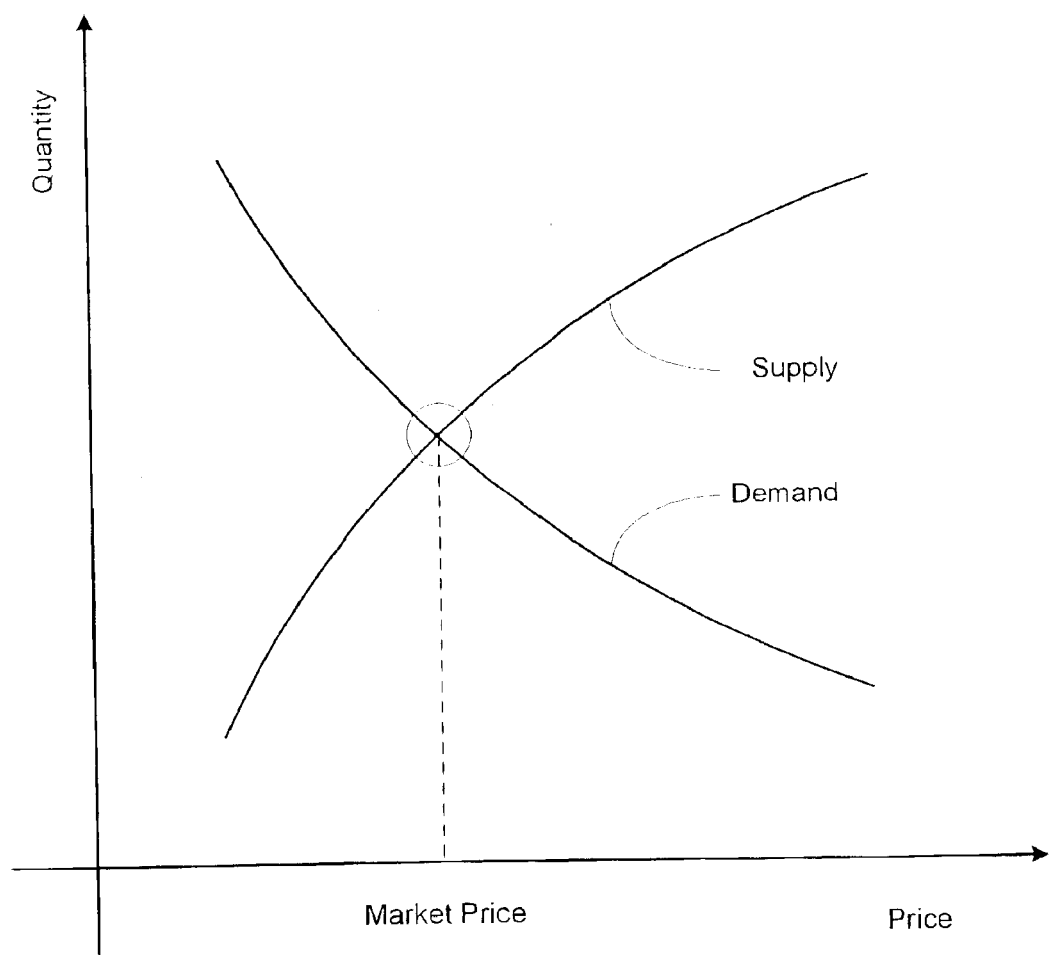
FIG. 11 is a graph of quantity supply and demand functions utilized to determine a market price in accordance with embodiments of the invention.

In accordance with the example illustrated in the flowchart of FIG. 9, bids for amounts of a cooling resource requested at the device areas are generated 910. The amount of the cooling resource requested may be expressed, for example, as a mass flow rate of liquid coolant directed to the area. A price is determined at which the cooling resource is available to the device areas 920. In this example, the market price is determined using supply and demand functions, illustrated in FIG. 11. The market price represents the point at which the price of the cooling resources is substantially equal to the demand. The cooling resources are directed 930 to the respective areas as a function of the determined price and the bids submitted the market agents.

Figure 10:
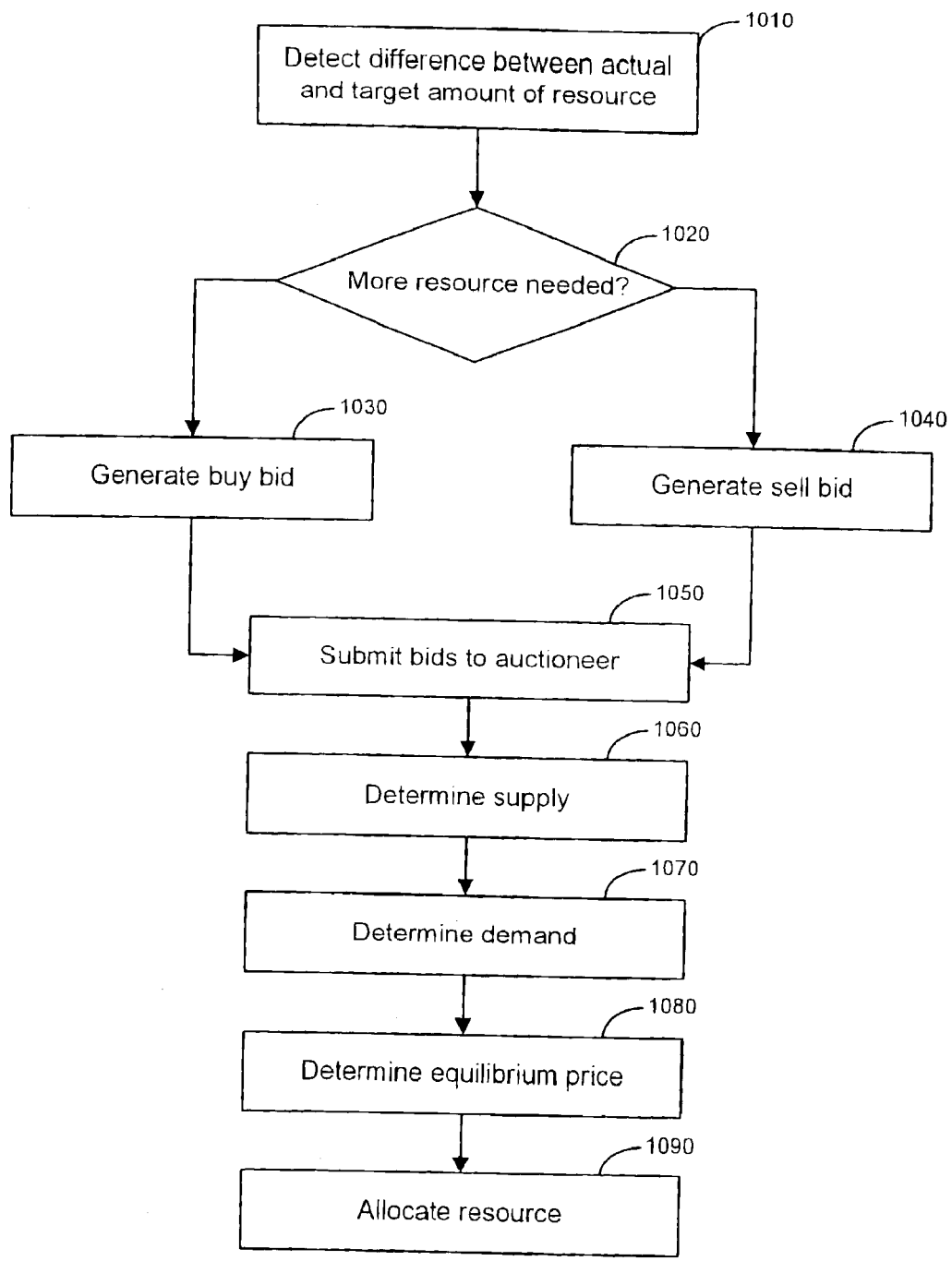
FIG. 10 is a flowchart illustrating bid generation and auction processes in accordance with embodiments of the invention.

FIG. 10 is a flowchart illustrating a method of generating bids and conducting an auction in accordance with an embodiment of the invention. The bids are used during an auction process to determine the allocation of cooling resources directed to the areas represented by the market agents. The auctions may be operated at periodic time intervals.

Prior to each auction, each market agent receives an allocation of "money" to spend for cooling resources. It should be pointed out that this money is not real, but a construct used to facilitate the bidding process. Whatever money is not spent during an auction may be erased, or it may be reallocated equally or according to some unequal distribution formula among the market agents. Money may he unequally distributed, for example, if there is an area of the device for which temperature control is more critical. In this situation, the area of the device for which temperature control is more critical would receive a larger percentage of the money.

Each market agent determines a difference 1010 between an existing amount of the cooling resource directed to the area and the desired amount of the cooling resource. For example, if temperature sensing is implemented, the market agent associated with a particular area may base the assessment of the desired amount of the cooling resource on the difference between an actual temperature of a device or component area and a target temperature. The market agent then Generates a bid based on the detected difference 1020. The market agent may generate a buy bid 1030 if the temperature of the area represented by the market agent is higher than a target temperature. The market agent may generate a sell bid 1040 if the temperature of the area is lower than the target temperature.

Continuing the temperature example, the decision for an $i^{th}$ agent to buy or sell cooling resources may be determined using the formula:

$$t_i = \frac{T_i^{target}}{T_i} \times \frac{T_{ave}}{T_{ave}^{target}} \begin{cases} > 1, \text{seller} \\ <, \text{buyer} \end{cases} \quad [1]$$

where $T_i$ is the temperature of the $i^{th}$ area, $T_i^{target}$ is the target temperature for the $i^{th}$ area, $T_{ave}$ is the average temperature of all areas, and $T_{ave}^{target}$ is the average temperature target of all areas. The term $$\frac{T_{ave}}{T_{ave}^{target}}$$

may be used to modulate the bids of individual device areas according to the average temperature of all areas across the device and a target average temperature. The modulating term may be used to adjust the individual bids of the device areas, for example, to implement a desired energy expenditure or savings goal.

When $t_i$ is greater than one, the area is considered a seller of cooling resources. When $t_i$ is less than one, the area is considered a buyer of cooling resources. Accordingly, a seller generates a sell bid, and a buyer generates a buy bid. Other formulations of decision criteria using temperature sensing are also within the scope of this invention. Furthermore, it will be recognized that the use different parameters would require modifications of the above formulations based on the specific parameters selected.

The bid includes a price component and a volume component, which may be specified, for example, as a mass flow rate. For example, if temperature is sensed the volume component will be a function of the difference between the target temperature and the actual temperature of an area, among other things. The price component indicates a price that an area is willing to pay for the cooling resource. Areas that wish to buy cooling resources will generally submit a higher bid price than areas that do not require cooling resources. The bid price is also a function of the difference between the actual and desired amount of cooling resources.

The bids from the individual market agents are submitted 1050 to the market auctioneer. The market auctioneer may have to iterate bids with the market agents if only a single bid is received (i.e., a single price and quantity) is submitted instead of an individual demand curve (i.e., a range of different prices and quantities). An aggregate demand function is determined 1060 for the bids submitted by the market agents. An aggregate supply function is determined 1070. The supply function may be computed from the price and quantities of the cooling resource made available by the cooling system, or from the sell bids submitted by the market agents. A market equilibrium price and quantity are computed 1080. In this implementation, the auctioneer mediates between goals of the market agents and the cooling system capabilities. The equilibrium price and quantity are found where the aggregate demand function and the aggregate supply function are substantially equal.

In one implementation, the cooling resource is allocated according to the bid price and the market equilibrium price. The market agents that submitted buy bids greater than the market equilibrium price will receive the amount of cooling resource requested. Accordingly, a buyer never pays more than the bid price. The allocated amounts of the cooling resource are directed 1090 to the areas of the device or component associated with the market agents making the winning bids.

The market-based control system may be implemented in software as an application operating on a central processor, wherein the market agent functions are procedures of the centralized application. Alternatively, the market agent functions may be distributed applications, running on individual processors located on or near the areas for which temperature control is provided.

For each individual auction, the amount of a cooling resource is fixed, while the amount of cooling resource can change from auction to auction. For example, it is likely that the total demand for cooling will be low during times that the device or component is not being used, and higher when the activity of the device or component is high. The market-based control methods described herein differ from a real auction in that the cooling resources are not transferred from one area to another, rather, the resource that would have gone to one area may be sent to another area by adjusting the mass flow rates of coolant directed to the respective areas.

A useful aspect of the embodiments of the invention is that the cooling system is compact and can be universally applied across various types of heat-producing components in a wide array of products, from servers to workstations and beyond. The cooling system can be adapted to the configuration of a particular chip. Preferably, each cooling cap is integrated into the package of a high-power/high-performance chip or set of chips, thereby allowing the cooling system assembly process to be simplified down to the simple attaching of cooling fluid lines to the cooled package's inlet and outlet. The resulting system may have a plurality of cooled semiconductor assemblies that are electronically interconnected and that share some cooling components such as condensers and pumps.

Although particularly useful in providing cooling resources to areas of an electronic device or component, the methods of the invention presented herein may also be used to control the allocation of heating resources to a device or component area, e.g., by delivering amounts of heated air or energizing a heater. This implementation may be used when it is critical to maintain isothermal operation of a device, such as a sensor or other standard device used for calibration.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for cooling a semiconductor device, comprising:
   generating respective bids for a cooling resource associated with a plurality or semiconductor device areas;
   determining a market price at which the cooling resource is available to the plurality of semiconductor device areas; and
   directing allocated amounts of the cooling resource to the plurality of semiconductor device areas as a function of the market price and the bids.

2. The method of claim 1, wherein generating each bid for cooling resources comprises comparing an amount of the cooling resource required to maintain a target temperature to an actual amount of the cooling resource delivered to a particular semiconductor device area.

3. The method of claim 1, wherein generating bids for cooling resources comprises comparing temperatures sensed at the plurality of areas of the semiconductor device to target temperatures of the plurality of semiconductor device areas.

4. The method of claim 1, wherein generating the bids for cooling resources comprises detecting a cooling regime at one or more of the plurality of semiconductor device areas.

5. The method of claim 1, wherein directing the allocated amounts of cooling resource to the plurality of semiconductor device areas comprises adjusting a flow rate of a coolant.

6. The method or claim 1, wherein generating the bids comprises generating buy bids.

7. The method of claim 6, wherein generating each buy bid comprises generating a request for a quantity of the cooling resource directed to a particular semiconductor device area.

8. The method of claim 6, wherein generating each buy bid comprises generating a request for an increase in the amount of the cooling resource directed to a particular semiconductor device area.

9. The method of claim 1, wherein generating the bids comprises generating sell bids.

10. The method of claim 9, wherein generating each sell bid comprises generating a request for a decrease in the amount of the cooling resource directed to a particular semiconductor device area.

11. The method of claim 1, wherein determining the market price comprises:
    determining a supply function for quantity versus price of the cooling resource;
    determining a demand function for quantity versus price of the cooling resource; and
    setting the market price of each unit of the cooling resource at a value at which the supply function is substantially equal to the demand function.

12. The method of claim 1, wherein allocating the cooling resource comprises:
    directing an increased amount of the cooling resource to one or more of the plurality of semiconductor device areas associated with bids greater than the market price; and
    directing a decreased amount of the cooling resource to one or more of the plurality of semiconductor device areas associated with bids less than the market price.

13. A method for temperature control of a semiconductor device, comprising:
    generating bids for a thermal resource, each bid associated with an amount of the thermal resource desired at one of a plurality of semiconductor device areas;
    determining a market price at which the thermal resource is available;
    allocating the thermal resource to the plurality of semiconductor device areas based on the market price and bids; and
    delivering allocated amounts of the thermal resource to the plurality of semiconductor device areas.

14. The method of claim 13, wherein the thermal resource comprises a heating resource.

15. The method of claim 13, wherein generating each bid comprises comparing an amount of the thermal resource required to maintain a target temperature to an actual amount of the thermal resource delivered to a particular semiconductor device area.

16. The method of claim 13, wherein determining the price comprises:
   determining a supply function for quantity versus price of the thermal resource;
   determining a demand function for quantity versus price of the thermal resource; and
   setting the price of each unit or the thermal resource at a value at which the supply function is substantially equal to the demand function.

17. The method or claim 13, wherein allocating the thermal resource comprises:
   directing an increased amount of the thermal resource to one or more semiconductor device areas associated with bids greater than the market price; and
   directing a decreased amount of the thermal resource to one or more semiconductor device areas associated with bids less than the market price.

18. An apparatus for cooling a semiconductor device, comprising:
   a sensing system for detecting a need for cooling resources at a plurality of semiconductor device areas;
   a delivery system for delivering the cooling resources to the plurality of semiconductor device areas; and
   a control system, coupled to the sensing system and the delivery system, and configured to generate bids for cooling resources, determine a market price of the cooling resources, and allocate the cooling resources to the plurality of semiconductor device locations based on the price and the bids.

19. The method of claim 18, wherein the control system comprises a plurality of market agents, each market agent associated with a particular semiconductor device area.

20. The method of claim 19, wherein each market agent is configured to generate bids for cooling resources by comparing an amount of the cooling resource required to maintain a target temperature at the particular semiconductor device area to an actual amount of the cooling resource delivered to the particular semiconductor device area.

21. The apparatus of claim 18, wherein the sensing system comprise an array of temperature sensors.

22. The apparatus of claim 18, wherein the sensing system comprises an optical sensor.

23. The apparatus of claim 18, wherein the sensing system comprises a cooling regime sensor.

24. The apparatus of claim 18, wherein the delivery system comprises a liquid spray cooling system.

25. The apparatus of claim 24, wherein the spray cooling system comprises an array of individually controllable sprayers, each sprayer configured to eject an incremental quantity of coolant in response to signals from the control system.

26. The apparatus of claim 18, wherein the delivery system comprises an array of thermal inkjet-type sprayers.

27. A device cooling system, comprising:
   means for generating respective bids for a cooling resource associated with a plurality of heat-generating electronic device areas;
   means for determining a market price at which the thermal resource is available to the plurality of heat-generating electronic device areas; and
   means for directing allocated amounts of the cooling resource to the plurality of heat-generating electronic device areas as a function of the market price and the bids.

28. A temperature control system, comprising:
   means for generating bids for a thermal resource, each bid associated with an amount of the thermal resource desired al one of a plurality of heat-generating electronic device areas;
   means for determining a market price at which the thermal resource is available;
   means for allocating the thermal resource to the plurality of heat-generating electronic device areas based on the market price and bids; and
   means for delivering allocated amounts of the thermal resource to the plurality of heat-generating electronic device areas.

29. A computer-readable medium configured with instructions for causing one or more computers to perform a method for cooling a heat-generating electronic device, the method comprising:
   generating respective bids for a cooling resource associated with a plurality of heat-generating electronic device areas;
   determining a market price at which the cooling resource is available to the plurality of heat-generating electronic device areas; and
   directing allocated amounts of the cooling resource to the plurality of heat-generating electronic device areas as a function of the market price and the bids.

30. A computer-readable medium configured with instructions for causing one or more commuters to perform a temperature control method, the method comprising:
   generating bids for a thermal resource, each bid associated with an amount of the thermal resource desired at one of a plurality of heat-generating electronic device areas;
   determining a market price at which the thermal resource is available;
   allocating the thermal resource to the plurality of heat-generating electronic device areas based on the market price and bids; and
   delivering allocated amounts of the thermal resource to the plurality of heat-generating electronic device areas.

* * * * *

UNITED STATES PATENT AND TRADEMARK OFFICE
CERTIFICATE OF CORRECTION

| | |
|---|---|
| PATENT NO. | : 6,925,364 B1 |
| APPLICATION NO. | : 10/365778 |
| DATED | : August 2, 2005 |
| INVENTOR(S) | : Bernardo Huberman et al. |

It is certified that error appears in the above-identified patent and that said Letters Patent is hereby corrected as shown below:

In column 1, line 42, delete "arc" and insert -- are --, therefor.

In column 3, line 54, delete "venerate" and insert -- generate --, therefor.

In column 4, line 43, delete "arc" and insert -- are --, therefor.

In column 5, line 35, after "at the" delete "l" and insert -- 1 --, therefor.

In column 6, line 38, after "respective" delete "l" and insert -- 1 --, therefor.

In column 9, line 62, delete "connectively" and insert -- convectively --, therefor.

in column 10, line 30, delete "arc" and insert -- are --, therefor.

In column 11, line 60, delete "he" and insert -- be --, therefor.

In column 12, line 16, delete "$\begin{cases} >1, seller \\ <, buyer \end{cases}$" and insert -- $\begin{cases} >1, seller \\ <1, buyer \end{cases}$ --, therefor.

In column 13, line 64, in Claim 1, delete "or" and insert -- of --, therefor.

In column 14, line 19, in Claim 6, delete "or" and insert -- of --, therefor.

In column 15, line 13, in Claim 16, delete "or" and insert -- of --, therefor.

In column 15, line 16, in Claim 17, delete "or" and insert -- of --, therefor.

In column 15, line 47, in Claim 21, delete "comprise" and insert -- comprises --, therefor.

In column 16, line 19, in Claim 28, delete "al" and insert -- at --, therefor.

UNITED STATES PATENT AND TRADEMARK OFFICE
CERTIFICATE OF CORRECTION

PATENT NO.         : 6,925,364 B1
APPLICATION NO. : 10/365778
DATED              : August 2, 2005
INVENTOR(S)        : Bernardo Huberman et al.

It is certified that error appears in the above-identified patent and that said Letters Patent is hereby corrected as shown below:

In column 16, line 44, in Claim 30, delete "commuters" and insert -- computers --, therefor.

Signed and Sealed this

First Day of September, 2009

David J. Kappos
*Director of the United States Patent and Trademark Office*